April 19, 1960

W. HEYWANG 2,933,619

SEMI-CONDUCTOR DEVICE COMPRISING AN
ANODE, A CATHODE AND
A CONTROL ELECTRODE

Filed March 23, 1954

INVENTOR.
Walter Heywang
BY
Atty.

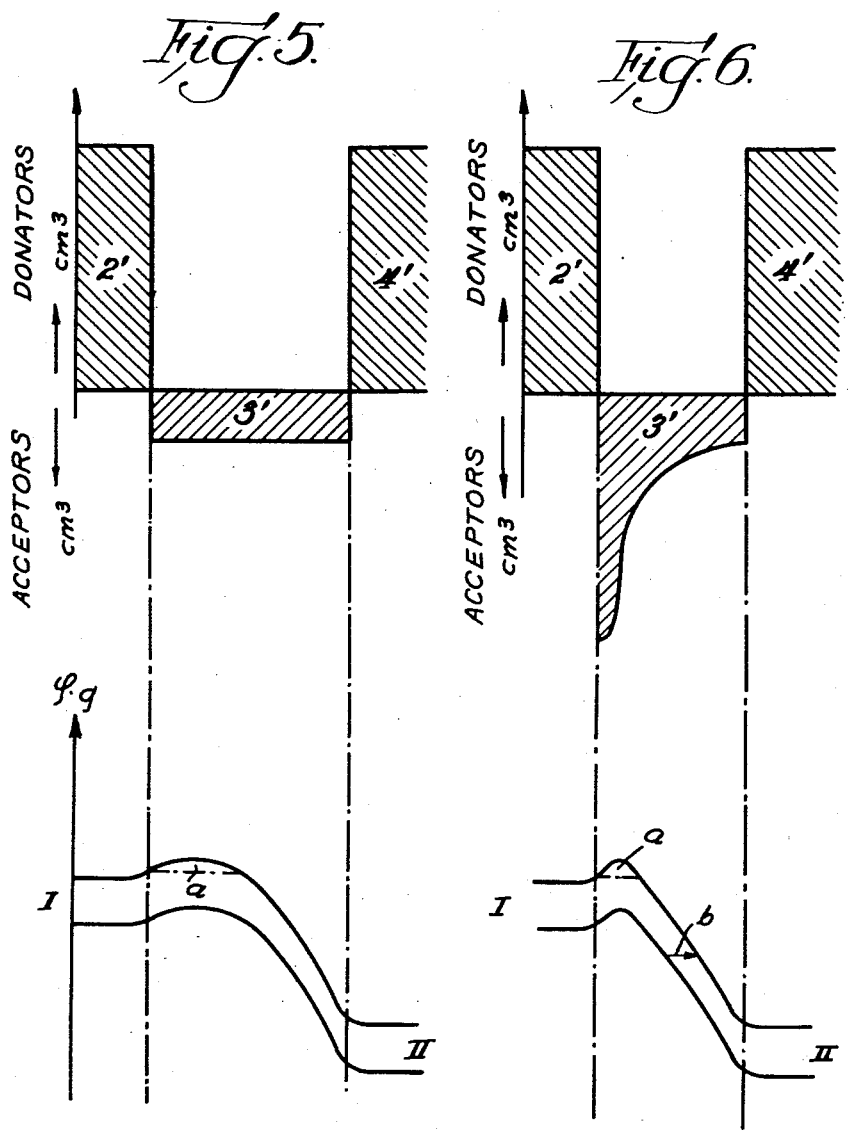

April 19, 1960

W. HEYWANG 2,933,619

SEMI-CONDUCTOR DEVICE COMPRISING AN
ANODE, A CATHODE AND
A CONTROL ELECTRODE

Filed March 23, 1954

INVENTOR.
Walter Heywang
BY
Att'y.

United States Patent Office 2,933,619
Patented Apr. 19, 1960

2,933,619

SEMI-CONDUCTOR DEVICE COMPRISING AN ANODE, A CATHODE AND A CONTROL ELECTRODE

Walter Heywang, Karlsruhe, Germany, assignor to Siemens & Halske Aktiengesellschaft, Munich and Berlin, Germany, a German corporation Application March 23, 1954, Serial No. 418,125

Claims priority, application Germany March 25, 1953

6 Claims. (Cl. 307—88.5)

This invention is concerned with a semi-conductor device comprising at least three electrodes which will be referred to as cathode, anode and control electrode, respectively. These designations differ from the designations base electrode, collector electrode and emitter electrode, respectively, employed in known semi-conductor devices, for example in transistors, thus pointing to essential distinguishing properties of the new device. The difference resides among others in the fact that the control electrode does not "emit" charges into the semi-conductor, as in the usual transistors, but that the electrodes of the new semi-conductor device are disposed in circuits and operate respectively as cathode, anode and control electrode in a similar manner as corresponding electrodes in amplifier tubes. The control electrode of the new semi-conductor device thus carries a blocking or bias potential against the cathode and the anode.

It may be mentioned here that semi-conductor devices are known in which the control electrode carries a blocking potential against the cathode and anode and in which the current flowing between the cathode and anode is controlled by varying the potential on the control electrode. Such control makes use of the fact that the space charge area is spatially increased in accordance with the magnitude of the blocking or bias potential, at a border zone between two semi-conductor parts of different conducting type, the increase being due to widening or narrowing, by variations of the space charge zone, of a narrow pass in the passage of the current between the cathode and anode which lie on one semi-conductor part of identical conduction type. This known arrangement will be referred to herein, in accordance with the indicated function, as "narrow pass" transistor. The drawbacks of such known transistor are that its utility is limited to frequencies estimated at lower than about 10 megacycles and that its sensitivity is relatively low.

The object of the invention is to avoid these drawbacks or at least to reduce them.

This object and other objects and features will be brought out in the detailed description which is rendered below with reference to the accompanying drawings. In these drawings, Fig. 1 shows an arrangement which will aid in explaining the known "narrow pass" transistor;

Fig. 2 is a diagram to illustrate the principle of the invention;

Fig. 3 indicates potential conditions;

Fig. 5 shows respectively the donator and acceptor densities of the different semi-conductor parts indicated in Fig. 7;

Fig. 6 illustrates the form of the potential block resulting from the distribution obtained in Fig. 5;

Figure 1:
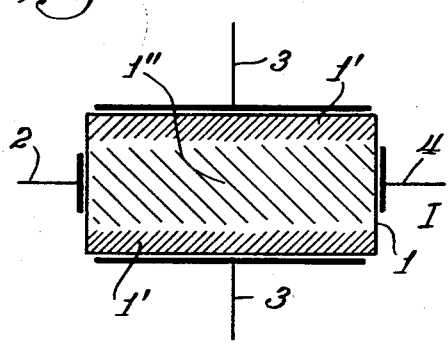

The operation of the known "narrow pass" transistor will now be explained with reference to Fig. 1. Numeral 1 indicates the semi-conductor with its electrodes 2, 3 and 4. The electrodes 2 and 4 will be referred to, for convenience, as cathode and as anode, respectively, and the electrodes 3 will be referred to as control electrode. A single electrode may be substituted for the electrodes 3. The semi-conductor parts 1' which are contacted by the electrodes 3 are of similar conducting type; the intervening portion 1" which is connected at the opposite ends by the electrodes 2 and 4 is of opposite conducting type. Assuming a certain blocking or bias potential between the control electrode 3 and the cathode 2, there will be formed space charge areas or zones at the border layers between 1' and 1", leaving in the center of the semi-conductor a zone which is free of space charge, that is, leaving free a narrow pass for the charge carriers flowing from the cathode 2 to the anode 4 and vice versa. Variations in the bias potential of the control electrode 3 against the cathode 2 will result in increase or decrease of the space charge zones at the border between 1' and 1" of the semi-conductor and consequently a change in the cross-sectional area of the narrow pass which is free of space charge, for the passage of the anode current between the electrodes 2 and 4.

This known arrangement permits some capacitive control because the electrode 3 is blocked as against the cathode 2. Between the control electrode 3 and the cathode 2 there is, however, a relatively high capacitance, which will be referred to as input capacitance. This input capacitance limits the utility of the known arrangement to frequencies estimated to be below about 10 megacycles. The sensitivity of the arrangement, that is, the variation of the anode current in dependence on the control potential at the electrode 3 is in addition relatively low.

As has been said before, the object of the invention is to overcome or to reduce these drawbacks in a semi-conductor arrangement or device comprising a cathode, an anode and a control electrode. This is accomplished by the provision of a semi-conductor with associated electrodes so constructed and arranged in circuit that the bias or blocking potential on the control electrode, in the path between the cathode 2 and the anode 4 produces, depending on the magnitude of the control voltage, a potential wall whose height and width are so low that it is overcome by the charge carriers thermally and/or by the tunnel effect along their passage between the cathode and the anode.

Figure 2:
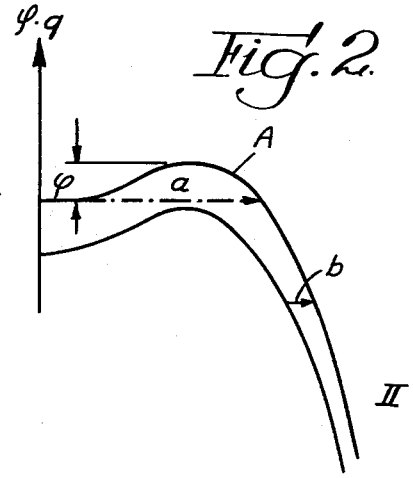

Fig. 2 illustrates the principle of the arrangement according to the invention by showing the potential conditions in the current path of the anode current or an essential part thereof. The term "anode current" is intended to mean the current between the anode and the cathode independent of the polarity of the charge carriers and the flow direction thereof. The term "potential" is for the sake of simplicity of explanation intended to mean the known electrostatic potential multiplied by the loading of the electrons and defect-electrons, respectively, of the anode current. At the left in Fig. 2 appears the potential I of one electrode (cathode 2 or anode 4) and at the right appears the potential II of the corresponding other electrode (4 or 2). The charge carriers on the passage from one to the other potential therefore must overcome the potential wall A. This overcoming may take place by thermal excitation and/or by the tunnel effect, for example, along the tunnel path $a$ shown in dot-dash lines.

Superimposed upon this desired anode current may be an undesired current due to inner field emission from the lower band in accordance with the Zener effect for example, along the path $b$. However, if care is taken, in accordance with the invention, to make the height $\varphi$ of the hill A and/or the length of the tunnel path $a$, which are criteria for the damping of the charge carriers in overcoming the tunnel, sufficiently small, so that the proportion of the charge carriers forming the anode current, which overcome the potential wall A between the cathode and the anode, along the tunnel path $a$ and/or thermally, is relatively great as compared with the charge carriers flowing along the Zener path $b$, there will result a strong dependence of the anode current from the height $\varphi$ of the hill A. It is further possible to change, as desired, the portions of the anode current which overcome the potential wall A along the tunnel path $a$ or thermally in their relative mutual ratio. For example, if emphasis is placed on a strong temperature dependence of the anode current, the tunnel path $a$ will be made relatively long so as to suppress the tunnel effect. Contrariwise, if small temperature dependence of the anode current is desired, the flanks of the hill A will be made with steep rise and drop in order to provide for a height $\varphi$ that can hardly be overcome thermally while providing instead for a short path $a$. Suitable means for doing this will be presently referred to. So far as the principle of the invention is concerned, such means include corresponding dimensioning or choice of the charge carrier density and distribution at the hill A. The corresponding means are also very well adapted to keep the number of charge carriers of the anode current flowing along the Zener path relatively small.

The thoughts underlying the invention are realized in particularly advantageous manner by dimensioning the semi-conductor and the distribution of the donators and acceptors therein so that the space charge zones between the cathode and control electrode or between anode and control electrode, respectively, cannot be freely formed but in interlacing or overlapping relationship.

Figure 3:
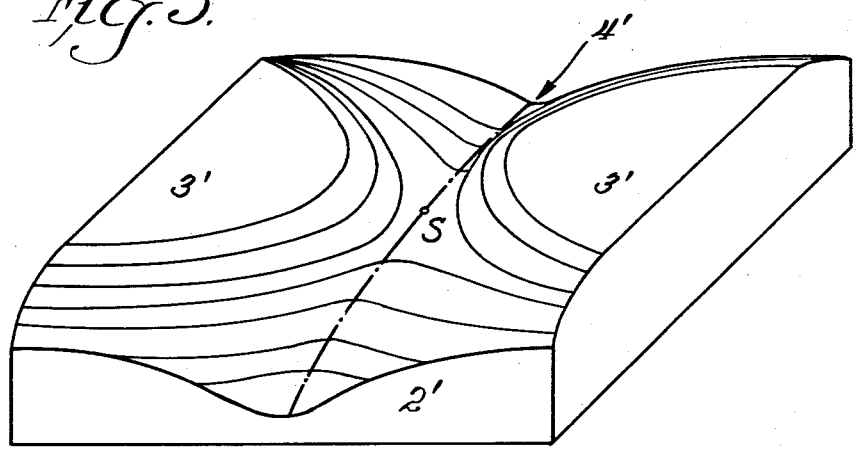

By proceeding in this manner, there will result a potential distribution in the path of the anode current as schematically indicated in Fig. 3. The semi-conductor parts 3'—3' which are connected with the control electrode are on approximately indentical potential and are blocked against the semi-conductor parts 2', 4' which are respectively connected with the cathode and anode. Due to the fact that the blocking layers between these parts are sufficiently close, there will be formed the potential saddle with its saddle point S as shown in Fig. 3. It is now possible, by suitable configuration of the semi-conductor parts 3', which are connected with the control electrode 3, to form the path indicated in dot-dash line, that is, the favorable path, in such a manner that the tunnel for the charge carriers, lying between the cathode 2 and the anode 4, can be overcome thermally and/or by the tunnel effect, as described before, and that the corresponding charge carriers form the preponderant proportion of the anode current.

A particularly suitable embodiment results however, by exchanging the electrodes, as contemplated by the invention, so that the cathode and anode are respectively connected with one of the semi-conductor parts 3' while the control electrode 3 is connected with the semiconductor parts 2' and/or 4'. The anode current will in such a case extend in accordance with the new path perpendicular to the path of the potential saddle shown in Fig. 3. In such embodiment, the height of the potential wall is not constant but, as apparent from Fig. 3, different along the section of the anode current. The lowest point of the potential wall that has to be overcome is at the saddle point S, and it was therefore found particularly advantageous to provide the potential conditions and semi-conductor dimensions such as to cause formation of the saddle point.

It is however, in accordance with a feature of this invention, possible and may in some cases be advantageous to make the potential conditions in the corresponding circuit arrangement so that the charge carriers do not find a potential wall or hill in a small portion of the cross section along their path from the cathode to the anode and vice versa. In such cases, there will be formed a narrow pass in the semi-conductor similar as in Fig. 1, however, with the essential difference that a considerable part of the charge carriers of the anode current must overcome the potential wall between cathode and anode along the tunnel path $a$ or thermally. The advantage thereby resulting resides above all in considerably increased sensitivity and smaller input capacitance due to the fact that the number of charge carriers which have to overcome the potential hill either along the tunnel path or thermally is very much dependent on the height $\varphi$ of the hill or wall A while such height is greatly effected by the control voltage.

Figure 4:
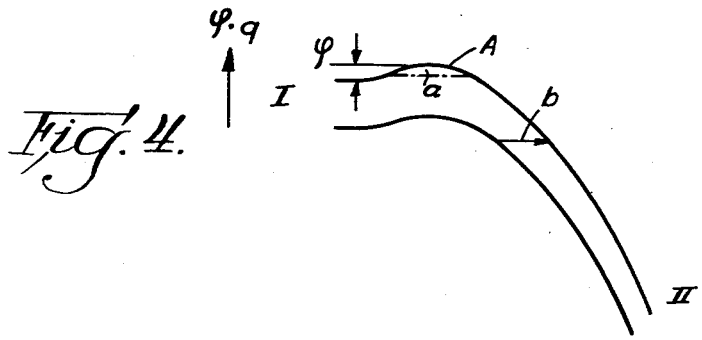
Fig. 4 is a diagram to illustrate potential conditions between cathode and anode obtained by overlapping of the space charge zones.

Fig. 4 shows the potential conditions between cathode and anode that may be easily realized by the proposed overlapping of the space charge zones. The symbols used in Fig. 4 correspond to those also used in Fig. 2. As will be seen, the height $\varphi$ of the potential wall A that has to be overcome by the charge carriers is very small and the tunnel path $a$ is as compared with the Zener path $b$ shorter than the one shown in Fig. 2. A strong dependence of the anode current on the control potential is thus obtained.

The conditions may be further improved, as indicated before, by corresponding selection of the donator and acceptor density in the semi-conductor. Fig. 5 indicates at the top the donator and acceptor densities in the various semi-conductor parts 2', 3', 4', of the structure illustrated in Fig. 7, along the path of a charge carrier of the anode current. As will be apparent, the donator and acceptor density in the parts 2' and 4' which are respectively connected with the cathode and anode, is great while the density in the intervening part 3' which is connected with the control electrode is in comparison small. The resulting favorable potential conditions along the path of the anode current, correspond substantially to those shown in Fig. 4, are indicated in the lower part of Fig. 5.

These conditions are considerably improved by an embodiment according to Fig. 6 in which the density of the donators and acceptors rises and falls, respectively, instead of remaining constant along the potential wall that has to be overcome. The advantages result from the form of the potential wall which is obtained by the distribution shown in Fig. 6. The potential wall forms in such a case only a short tunnel path $a$ which has become substanially more favorable relative to the Zener path $b$ than in an embodiment as indicated in Fig. 2.

Figure 7:
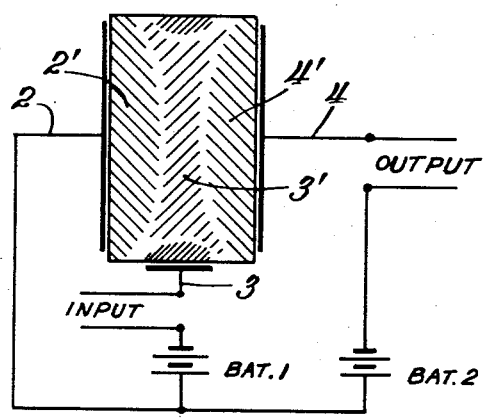
Fig. 7 shows an embodiment of the semi-conductor made in accordance with the invention.

Fig. 7 illustrates in schematic sectional view a preferred embodiment of the semi-conductor device in which the control electrode blocking potential is illustrated as being derived from a suitable battery Bat. 1 and the anode potential from a suitable battery Bat. 2. The semi-conductor parts of one conducting type, respectively connected with the cathode 2 and anode 4 form flat opposed surfaces separated by a very thin semi-conductor part 3' of the opposed conducting type which is connected with the control electrode 3. The different conducting parts are indicated by cross hatchings extending in different directions and the respective density of the donators and acceptors is indicated by the relative density of the cross hatching. It will be seen that the density of the donators and acceptors in the control part 3' which lies between the parts 2', 4', is in accordance with the conditions of Fig. 5 less than that of the parts 2', 4' which are respectively connected with the cathode 2 and the anode 4.

A further improvement (not indicated in Fig. 7) may be obtained by making the density of the semi-conductor part which lies between 2' and 4' different in accordance with the conditions discussed in connection with Fig. 6. The high density of the respective acceptors and donators of the part 3' must respectively face the semi-conductor parts 2' and 4' from which the charge carriers forming the anode current enter into the part 3′. It is recommended, for reasons having to do with manufacturing and the like, to make the part 3′ project in wedgelike manner between the parts 2′ and 4′. The point of the wedge and the part of the semi-conductor 3′ between the semi-conductor parts 2′, 4′ is made very thin, so as to favor the formation of the saddle. The thickness of the part 3′ between the parts 2′, 4′ is preferably less than about 10 $\mu$ (microns) and especially only about 1 $\mu$ (microns).

Figure 8:
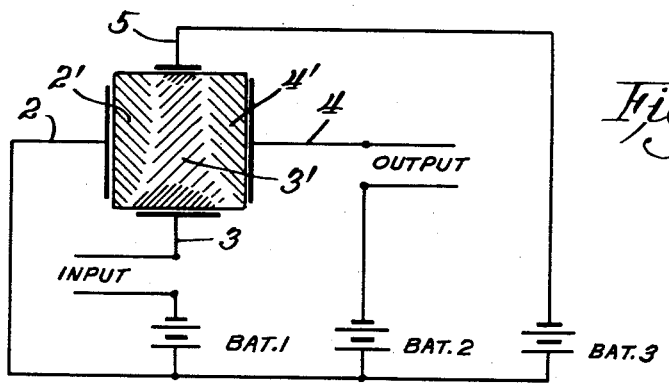
Fig. 8 indicates a modification.

Instead of being symmetrical, as shown in Fig. 7, the arrangement may be nonsymmetrical as illustrated diagramatically in Fig. 8. As will be seen, the part 3′ projects in Fig. 8 wedgelike only from one side between the parts 2′ and 4′. An additional control electrode 5 may be provided opposite the control electrode 3 for connection with a further control voltage source such as a battery Bat. 3.

The thoughts and suggestions promulgated by the invention apply for the case that the charge carriers forming the anode current consist of electrons as well as for the case that they are defect electrons. The different conduction types or donators and acceptors are accordingly exchangeable.

The operation of the semi-conductor arrangement may be further improved by suitably selecting and mutually tuning or coordinating for a common end the operation temperature, the semi-conductor material used and the thickness of the mean conducting zone. It is especially possible to improve the control effect of the potential wall by thermal overcoming and/or by the tunnel effect, by maintaining the semi-conductor arrangement during the operation at a suitable temperature. The optimal temperature should be established experimentally because if the temperature is greatly increased, the conductivity of the semi-conductor arrangement may become too great and may overshadow the transistor properties. The temperature should on the other hand be tuned to the semi-conductor material used.

In accordance with a special feature of the invention, one of the conducting zones may form an intrinsic area; for example, the middle zone may constitute an intrinsic area and the outer zones may form n- or p-areas Further area combinations with differential characteristics are possible to obtain at the border zones desired potential conditions depending on the concentration of the respective acceptors and donators. The use of intrinsic areas will under some circumstances permit operation with relatively low temperatures. It is in some circumstances even possible to obtain an optimal operation at temperatures lying below room temperature by the use of suitable materials and corresponding arrangement of zones of different conductivity. A desired temperature curve of the indicated values may also be obtained by suitable doping. At least the middle zone of the semi-conductor arrangement has in accordance with the invention a thickness which is dependent on and in accordance with the particular semi-conductor material used, such thickness being on the order of magnitude of the diffusion length of the charge carrier which depends on the semi-conductor material.

As an example, silicon is a semi-conductor material with which an increased operating temperature is suitably used. Germanium furnishes the advantage of permitting an operating temperature only a little in excess of room temperature.

The use of material exhibiting high mobility for the charge carriers is especially suitable, such as is for example exhibited by semi-conductor materials made of elements of the third and fifth or of the second and sixth group of the periodic system. Semi-conductors which crystallize in fluorspar or antifluospar are likewise advantageous.

The circuits for the semi-conductor arrangements may be of known types and components throughout, depending on the particular use to which the arrangement is to be put.

What is believed to be new and desired to have protected by Letters Patent is defined in the appended claims.

I claim:

1. A semiconductor device comprising a semiconductor crystal having at least two junctions formed by two outer zones of opposite conduction type and an intermediate relatively very thin zone extending between said junctions in a direction transverse to the junction lines formed thereby and coextensive therewith, the doping density of said intermediate zone differing from end to end thereof as compared with the doping density of said junctions, an anode and a cathode electrode respectively connected with said junctions, a control electrode connected with said intermediate zone, and means for connecting to said control electrode a blocking potential which is operative relative to said anode and cathode to produce space charges at said junction lines which interlace mutually along the flanks of said intermediate zone.

2. A semiconductor device according to claim 1, comprising an auxiliary electrode connected to said intermediate zone and means for connecting a potential thereto, said blocking potential on said control electrode and said potential on said auxiliary electrode causing a predetermined potential rise at the flanks of said intermediate zone.

3. A semiconductor device according to claim 1, wherein the thickness of said intermediate zone is on the order of between 1 $\mu$ and 10 $\mu$.

4. A semiconductor device according to claim 3, wherein said intermediate zone extends in wedgelike configuration between said junctions.

5. A semiconductor device according to claim 1, wherein said intermediate zone is an intrinsic zone.

6. A semiconductor device according to claim 5, wherein the thickness of the conducting area of said intermediate zone corresponds to the diffusion length of the charge carriers therein.

References Cited in the file of this patent

UNITED STATES PATENTS

| | | |
|---|---|---|
| 2,623,105 | Shockley et al. | Dec. 23, 1952 |
| 2,624,016 | White | Dec. 30, 1952 |
| 2,764,642 | Shockley | Sept. 25, 1956 |
| 2,790,037 | Shockley | Apr. 23, 1957 |